(No Model.) 2 Sheets—Sheet 1.

T. L. McKEEN.
LEVER BRACKET FOR CAR COUPLINGS.

No. 447,578. Patented Mar. 3, 1891.

Witnesses:
Percy C. Bowen
E. Wilkinson

Inventor:
Thomas L. McKeen
By C. S. Whitman
Attorney.

THE NORRIS PETERS CO., PHOTO-LITHO., WASHINGTON, D. C.

(No Model.) 2 Sheets—Sheet 2.
T. L. McKEEN.
LEVER BRACKET FOR CAR COUPLINGS.
No. 447,578. Patented Mar. 3, 1891.

Witnesses
N. B. Harris
Ernest Wilkinson

Inventor:
Thomas L. McKeen
by
C. S. Whitman
Attorney.

UNITED STATES PATENT OFFICE.

THOMAS L. McKEEN, OF NEW YORK, N. Y., ASSIGNOR TO THE THURMOND CAR COUPLING COMPANY, OF WEST VIRGINIA.

LEVER-BRACKET FOR CAR-COUPLINGS.

SPECIFICATION forming part of Letters Patent No. 447,578, dated March 3, 1891.

Application filed October 25, 1890. Serial No. 369,346. (No model.)

*To all whom it may concern:*

Be it known that I, THOMAS L. MCKEEN, a citizen of the United States, residing at New York, in the county of New York and State of New York, have invented certain new and useful Improvements in Brackets; and I do hereby declare the following to be a full, clear, and exact description of the invention, such as will enable others skilled in the art to which it appertains to make and use the same.

My invention relates to brackets for holding rods or bars, and is specially applicable to brackets for lifting-bars used in coupling and uncoupling cars.

The object of my invention is to provide a bracket that may readily be opened from the front to receive the rod or bar, thus avoiding the necessity of inserting the bar from the end, which in cases of crooked or irregular-shaped bars often becomes impossible, it being necessary in such cases to put the bar while straight in the bracket and then to bend it while the bracket is on. How I accomplish this result will be readily understood by reference to the accompanying drawings, wherein the same parts are indicated by the same letters.

Figure 1:
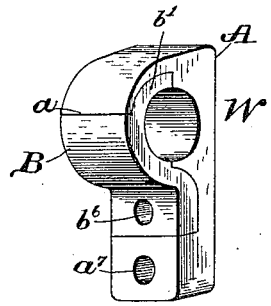
Figure 2:
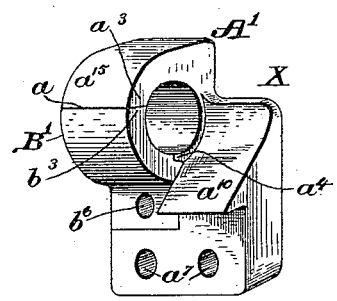
Figure 3:
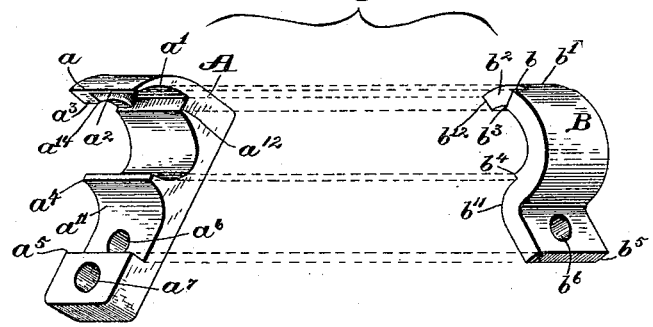
Figure 4:
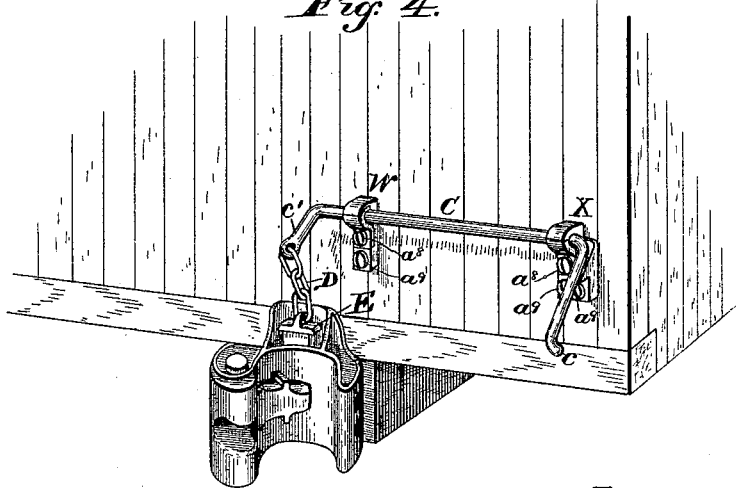
Figure 5:
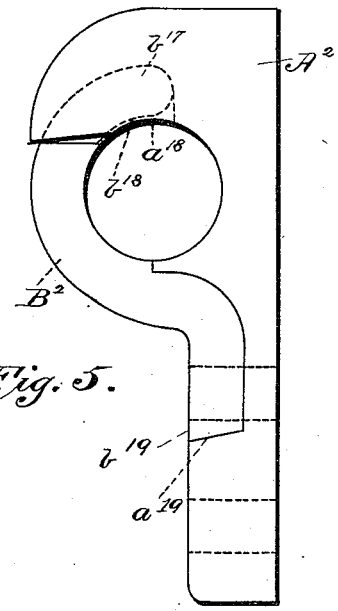
Figure 6:
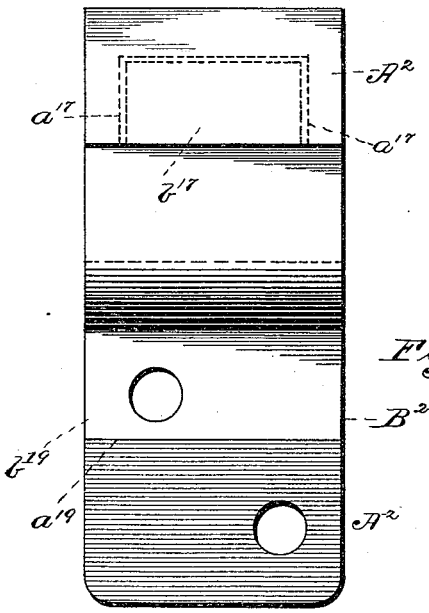
Figure 7:
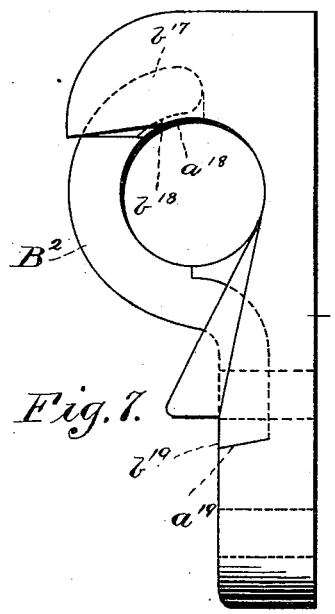
Figure 8:
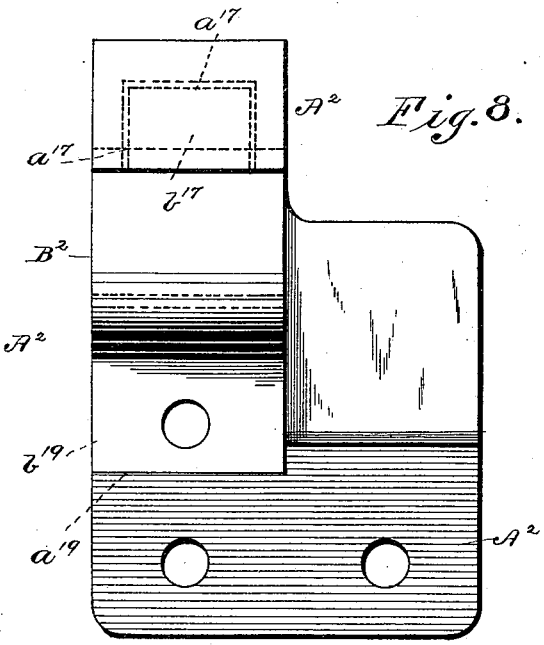

Figure 1 represents a perspective view of one form of my improved bracket. Fig. 2 represents a perspective view of a modification of the same. Fig. 3 represents a perspective view showing the details of the device shown in Fig. 1. Fig. 4 represents a perspective view of the end of a freight-car, showing my improved brackets in use holding the lifting-bar for the coupling-pin. Fig. 5 represents a profile view of a modification of Fig. 1. Fig. 6 represents a plan view of the device shown in Fig. 5. Fig. 7 represents a profile view of a modification of Fig. 2. Fig. 8 represents a plan view of the device shown in Fig. 7.

A and A′ represent the body of the bracket having a flat back, which is screwed to any suitable support.

B and B′ represent the movable piece for opening or closing the bracket from the front.

C represents the lifting-bar with crank or handle $c$ and short arm $c'$, raising and lowering the coupling-pin E by means of the chain D.

B is represented as being adjustable from one side only of A.

In order to make the bracket secure, I cut away the upper jaw of A, as seen at $a'$, leaving the face $a$ in front and a lug $a^2$ with face $a^3$ at one side thereof. The lower jaw of A has the face $a^4$ and hollowed-out space $a^{11}$, with shoulder $a^5$ and bolt-hole $a^6$. B is made so that the faces $b^{12}$ $b^2$ $b^3$ $b$ abut the faces $a^{12}$, $a^2$, $a^3$, $a$, and $a^4$, respectively, while the convex surfaces $b'$ and $b^{11}$ fit into the concave surfaces $a'$ and $a^{11}$. The distance to which B should be moved in the score $a'$ is controlled by the lug $a^{14}$. When $b^2$ abuts against $a^2$, then the bolt-hole $b^6$ will be over the bolt-hole $a^6$, and by inserting the bolt $a^8$, Fig. 4, B is held securely in A. The bracket is secured to the car, door-frame, or other support, as the case may be, with screws $a^8$ and $a^9$, as in Fig. 4.

In Fig. 2 the connections of A′ and B′ in both jaws of A′ are precisely similar to those of A and B in Fig. 1, but that B′ is inserted from the opposite side. The shape of A′ is modified somewhat from that of A in having a lug $a^{10}$ to support the handle $c$ of the lifting-bar C, thus rendering said handle more easy to be taken hold of than if it were hanging close alongside of the car.

In Figs. 5, 6, 7, and 8 the movable piece B² has a tongue $b^{17}$, registering with a recess in the upper jaw of A², said recess having two side walls $a^{17}$, slightly greater in depth than the tongue $b^{17}$. There being little or no pressure upward on the lower faces $a^{18}$ of these walls $a^{17}$, it is not necessary to have the lower face $b^{18}$ of said tongue flush with $a^{18}$. At the lower end of the movable piece the faces $a^{19}$ and $b^{19}$ are beveled somewhat, as shown in Figs. 5 and 7, both in order that the movable piece may be adjusted easily and that at the same time the tongue $b^{17}$ may be wedged up into place when B² is screwed down. In other respects the devices are identical with those shown in Figs. 1 to 5.

The convenience of using these brackets will be readily understood by reference to Fig. 4, where W and X are the brackets, D the lifting-chain, and E the locking-bar of the coupler.

In the old style of brackets made of one piece the bar C would have had the brackets put on while straight and then would have been bent into shape, and if the bar C became unduly bent or injured in any way while in use the brackets, as well as the bar, had to be removed from the car to remedy the defect, while with my invention the bar may be put in or taken out at any time by simply unscrewing one screw of the brackets.

What I claim, and desire to secure by Letters Patent, is—

In a bracket, the combination of a rear section A, screwed to the bracket-support and having jaws with curved recesses $a'$ and $a^{11}$, a lug $a^{14}$, and faces $a$, $a^2$, $a^3$, $a^{12}$, $a^4$, and $a^5$, and bolt-holes $a^6$ and $a^7$, with a movable section B, having convex surfaces $b'$ and $b^{11}$ registering with the concave surfaces $a'$ and $a^{11}$, the faces $b$, $b^2$, $b^3$, $b^{12}$, $b^4$, and $b^5$ registering with $a$, $a^2$, $a^3$, $a^{12}$, $a^4$, and $a^5$, and bolt-hole $b^6$ registering with $a^6$, as and for the purposes described.

In testimony whereof I affix my signature in presence of two witnesses.

THOMAS L. McKEEN.

Witnesses:
WM. M. LYDDY,
A. H. FORD.